United States Patent
Ohashi

(10) Patent No.: US 11,411,508 B2
(45) Date of Patent: Aug. 9, 2022

(54) POWER CONVERSION DEVICE AND POWER CONVERSION METHOD

(71) Applicant: Panasonic Intellectual Property Management Co., Ltd., Osaka (JP)

(72) Inventor: Kazuma Ohashi, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/967,056

(22) PCT Filed: Nov. 9, 2018

(86) PCT No.: PCT/JP2018/041576
§ 371 (c)(1),
(2) Date: Aug. 3, 2020

(87) PCT Pub. No.: WO2019/150694
PCT Pub. Date: Aug. 8, 2019

(65) Prior Publication Data
US 2021/0044214 A1 Feb. 11, 2021

(30) Foreign Application Priority Data
Feb. 5, 2018 (JP) .............................. JP2018-017786

(51) Int. Cl.
*H02M 1/42* (2007.01)
*H02M 7/217* (2006.01)
*H02M 1/00* (2006.01)

(52) U.S. Cl.
CPC .......... *H02M 7/217* (2013.01); *H02M 1/4225* (2013.01); *H02M 1/0085* (2021.05)

(58) Field of Classification Search
CPC ................................................ H02M 1/4225
See application file for complete search history.

(56) References Cited

U.S. PATENT DOCUMENTS

| 5,479,336 A | 12/1995 | Motoki et al. |
| 8,866,452 B1 * | 10/2014 | Kost ................... H02M 1/4225 |
| | | 323/246 |

(Continued)

FOREIGN PATENT DOCUMENTS

| JP | 63-167664 | 7/1988 |
| JP | 7-7946 | 1/1995 |

(Continued)

OTHER PUBLICATIONS

S. Yang and X. Tong, "Voltage Feedforward Control with Time-Delay Compensation for Grid-Connected Converters," Journal of Power Electronics, vol. 16, No. 5, pp. 1833-1842, Sep. 2016. (Year: 2016).*

(Continued)

*Primary Examiner* — Peter M Novak
(74) *Attorney, Agent, or Firm* — Wenderoth, Lind & Ponack, L.L.P.

(57) ABSTRACT

A power conversion device includes: a voltage conversion circuit that converts an AC voltage input into a DC voltage by PWM control and outputs the DC voltage; an input voltage detection circuit that detects the AC voltage input to the voltage conversion circuit and outputs a detection signal; an input current detection circuit that detects an AC current input to the voltage conversion circuit and outputs a detection signal; an output voltage detection circuit that detects the DC voltage output from the voltage conversion circuit and outputs a detection signal; and a control circuit that corrects a phase of a PWM signal for the PWM control based on the detection signal from the input voltage detection circuit, the detection signal from the input current detection circuit, and the detection signal from the output voltage detection circuit, and outputs the PWM signal corrected to the voltage conversion circuit.

9 Claims, 13 Drawing Sheets

(56) References Cited

U.S. PATENT DOCUMENTS

2016/0065055 A1* 3/2016 Lim ................. H05B 45/44
                                                    315/200 R
2016/0322907 A1* 11/2016 Hwang ............... H02M 1/4208

FOREIGN PATENT DOCUMENTS

| JP | 2005-102489 | 4/2005 |
| JP | 2016-7088 | 1/2016 |
| JP | 2017-22900 | 1/2017 |
| WO | 2014/119033 | 8/2014 |
| WO | 2015/105041 | 7/2015 |

OTHER PUBLICATIONS

International Search Report dated Dec. 25, 2018 in corresponding International Application No. PCT/JP2018/041576.

* cited by examiner

POWER CONVERSION DEVICE AND POWER CONVERSION METHOD

TECHNICAL FIELD

The present disclosure relates to a power conversion device and a power conversion method for converting an AC voltage into a DC voltage, and particularly to a power conversion device and a power conversion method that are aimed to adjust control for zero-cross of an input current (zero current crossing) and improve a power factor.

BACKGROUND ART

Electronic equipment to be connected to AC power supplies, such as commercial power supplies, are required to comply with current harmonic regulation in consideration of an influence on the entire power supply, so that it has become common to use a power factor correction circuit in a voltage conversion circuit from an AC voltage into a DC voltage.

The current harmonic regulation is also set for independent power supplies for aircrafts, ships, etc., but the input frequencies of them are as very high as 400 Hz (360 Hz to 800 Hz), compared to the input frequencies of the commercial power supplies that are 50 and 60 Hz, so that the adjustment is difficult and the standard of the current harmonic regulation becomes very strict as represented by DO-160 and IEEE 519.

FIGS. 1A and 1B are diagrams respectively showing examples of power conversion devices 10A, 10B each including a power factor correction circuit having a bridgeless configuration, and FIG. 2 is a diagram showing an example of an input current waveform. Since a signal of an actual input AC voltage, detected by input voltage detection circuit 103, includes a circuit delay, a delay also occurs in a calculated pulse width modulation (PWM) signal (control signal) that has been calculated by control circuit 15A, 15B based on the zero-cross of the signal. Therefore, the output of the PWM signal is delayed with respect to the input AC voltage, which causes a distortion in the input current waveform.

PTL 1 discloses a DC power supply device that can reduce harmonic components of an input current and optimally improve a power factor. This DC power supply device is configured such that when an AC voltage of an AC power supply crosses zero, the device closes a switch unit after a preset first delay time from the passage time, and opens the switch unit after a preset second delay time from the passage time. Thereby, harmonic components of an input current can be reduced.

CITATION LIST

Patent Literature

PTL 1: Unexamined Japanese Patent Publication No. H7-007946

SUMMARY OF THE INVENTION

However, the technology disclosed in PTL 1 is to improve current harmonics by adding control of a switch for a certain period of time based on the zero-cross of a voltage detected by an input current detection circuit, but the technology is not to correct the aforementioned delay.

The present disclosure has been made in order to solve the above problems with delay, and an object of the disclosure is to provide a power conversion device and a power conversion method that can reduce input current harmonics by correcting a delay between an input AC voltage and a PWM signal.

A power conversion device according to the present disclosure includes: a voltage conversion circuit that converts an AC voltage input to the voltage conversion circuit into a DC voltage by PWM control and outputs the DC voltage; an input voltage detection circuit that detects the AC voltage input to the voltage conversion circuit and outputs a detection signal; an input current detection circuit that detects an AC current input to the voltage conversion circuit and outputs a detection signal; an output voltage detection circuit that detects the DC voltage output from the voltage conversion circuit and outputs a detection signal; and a control circuit that corrects a phase of a PWM signal for the PWM control based on the detection signal from the input voltage detection circuit, the detection signal from the input current detection circuit, and the detection signal from the output voltage detection circuit, and outputs the PWM signal corrected to the voltage conversion circuit.

A power conversion method according to the present disclosure includes: a first step of detecting an AC voltage input to a voltage conversion circuit and outputting a detection signal; a second step of detecting an AC current input to the voltage conversion circuit and outputting a detection signal; a third step of converting the AC voltage input to the voltage conversion circuit into a DC voltage by PWM control and outputting the DC voltage; a fourth step of detecting the DC voltage output in the third step and outputting a detection signal; and a fifth step of correcting a phase of a PWM signal for the PWM control based on the detection signal output in the first step, the detection signal output in the second step, and the detection signal output in the fourth step, and outputting the PWM signal corrected to the voltage conversion circuit.

Thereby, a power conversion device and a power conversion method that can reduce input current harmonics by correcting a delay between an input AC voltage and a PWM signal and that are effective for optimizing current harmonic characteristics can be provided.

DESCRIPTION OF EMBODIMENTS

Hereinafter, exemplary embodiments will be described in detail with reference to the drawings as appropriate. However, more detailed description than necessary may be omitted. For example, detailed description of already well-known matters and duplicate description of substantially the same configurations may be omitted. This is to avoid unnecessary redundancy in the following description and to facilitate understanding by those skilled in the art.

Note that the attached drawings and the following description are provided for those skilled in the art to fully understand the present disclosure, and they are not intended to limit the subject matters described in the appended claims.

First Exemplary Embodiment

Hereinafter, a first exemplary embodiment will be described with reference to FIGS. 3 to 5.

1-1. Configuration

Figure 3:
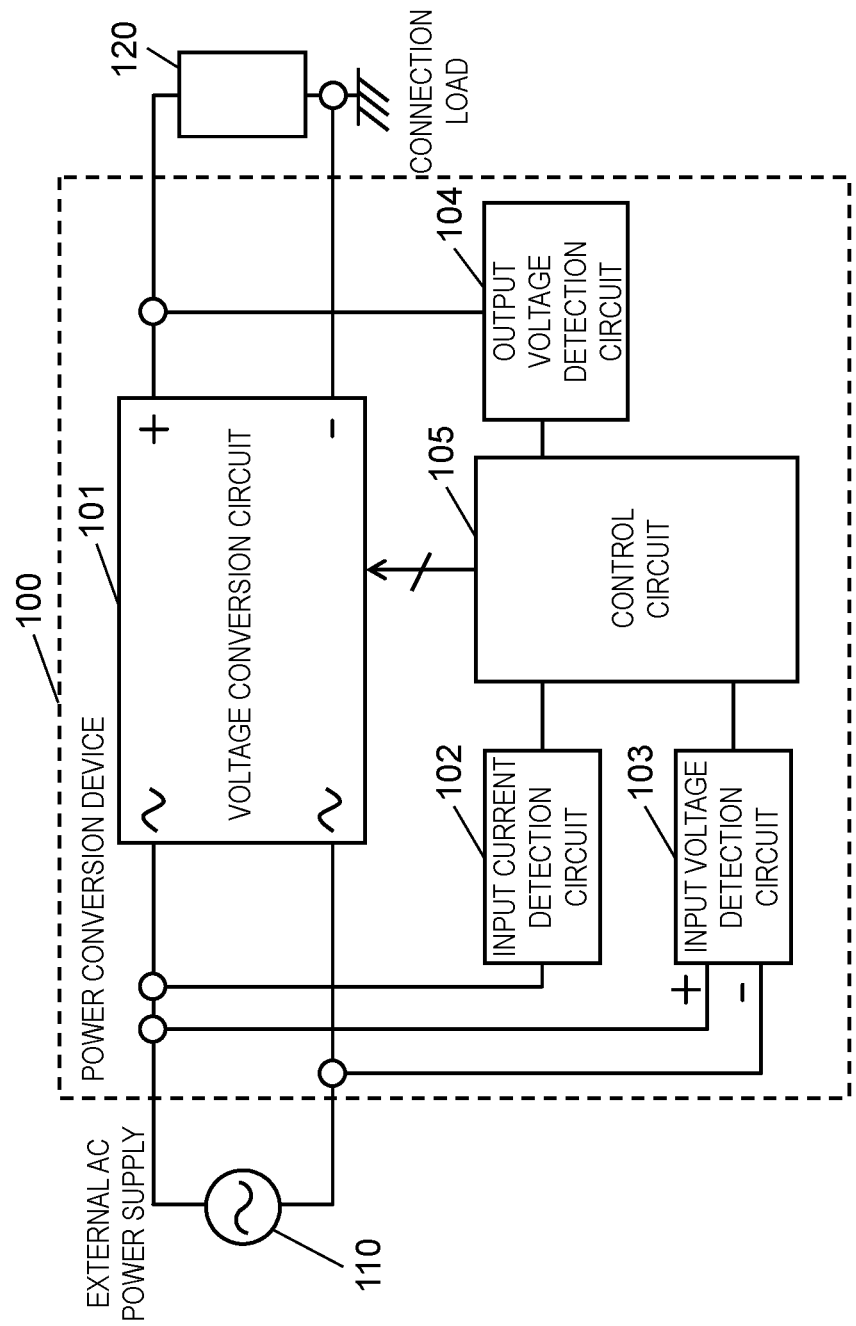
FIG. 3 is a block diagram showing a configuration of a power conversion device according to a first exemplary embodiment.

FIG. 3 is a block diagram showing a configuration of power conversion device 100. Power conversion device 100 includes voltage conversion circuit 101, input current detection circuit 102, input voltage detection circuit 103, output voltage detection circuit 104, and control circuit 105. Power conversion device 100 is connected to external AC power supply 110 and connection load (load connection part) 120.

External AC power supply 110 is installed in, for example, an aircraft, is a power supply with an output frequency of 400 Hz to 800 Hz, and is connected to voltage conversion circuit 101, input current detection circuit 102, and input voltage detection circuit 103. External AC power supply 110 supplies an AC voltage to voltage conversion circuit 101.

Connection load 120 is connected to voltage conversion circuit 101 and output voltage detection circuit 104. Connection load 120 supplies and receives a DC voltage output from voltage conversion circuit 101. Connection load 120 is, for example, electronic equipment or the like that can operate with a DC voltage. Additionally, it may be a circuit in a subsequent stage that constitutes the power conversion circuit.

Voltage conversion circuit 101 is connected to external AC power supply 110, input current detection circuit 102, input voltage detection circuit 103, output voltage detection circuit 104, control circuit 105, and connection load 120.

Voltage conversion circuit 101 converts an AC voltage input from external AC power supply 110 into a DC voltage by a PWM signal output from control circuit 105, and supplies to connection load 120. Voltage conversion circuit 101 includes, for example, voltage conversion circuit 101A including a semi-bridgeless power factor correction circuit having a bridgeless configuration shown in FIG. 1A, or voltage conversion circuit 101B including a totem-pole power factor correction circuit having a bridgeless configuration shown in FIG. 1B. Voltage conversion circuit 101A includes inductors L1, L2, metal-oxide-semiconductor field-effect transistor (MOSFET) switching elements Q1, Q2, and diodes D1, D2. Voltage conversion circuit 101B includes inductor L1, MOSFET switching elements Q1, Q2, and diodes D1, D2. Diodes D1, D2 can be replaced with MOSFET switching elements, and control circuit 105 may perform on-off control.

Input current detection circuit 102 is connected between external AC power supply 110 and voltage conversion circuit 101. Input current detection circuit 102 detects an AC current input from external AC power supply 110 to voltage conversion circuit 101, converts it into a voltage value according to the detected current value, and outputs a detection signal to control circuit 105. Input current detection circuit 102 is, for example, a circuit that outputs, by a gain amplifier, a voltage value applied to both ends of a resistor inserted between external AC power supply 110 and voltage conversion circuit 101. Instead of the resistor, a transformer or a current sensor using a Hall effect may be used.

Input voltage detection circuit 103 is connected between external AC power supply 110 and voltage conversion circuit 101. Input voltage detection circuit 103 outputs to control circuit 105 a detection signal obtained by converting an AC voltage input from external AC power supply 110 to voltage conversion circuit 101 into a voltage value that can be input to control circuit 105. Input voltage detection circuit 103 is, for example, a circuit that outputs a voltage divided by resistors with a gain amplifier. Instead of the resistor, a transformer may be used.

Input voltage detection circuit 103 shown in FIG. 3 has two pieces of input because of differential input, but single-phase input having one piece of input may be acceptable.

Output voltage detection circuit 104 is connected between voltage conversion circuit 101 and connection load 120. Output voltage detection circuit 104 outputs to control circuit 105 a detection signal obtained by converting a DC voltage output from voltage conversion circuit 101 into a voltage value that can be input to control circuit 105. Output voltage detection circuit 104 is, for example, a circuit that outputs a voltage divided by resistors with a gain amplifier.

Control circuit 105 is connected to input current detection circuit 102, input voltage detection circuit 103, output voltage detection circuit 104, and voltage conversion circuit 101. Control circuit 105 generates a PWM signal for controlling voltage conversion circuit 101 based on the detection signals output from input current detection circuit 102, input voltage detection circuit 103, and output voltage detection circuit 104.

At this time, control circuit 105 monitors a voltage value (output voltage) of the detection signal output from input voltage detection circuit 103, and starts to output the PWM signal at the timing when control circuit 105 detects that the output voltage crosses a threshold.

When there is no phase difference between the outputs of external AC power supply 110 and input voltage detection circuit 103, and when the threshold is zero, the phase difference between the PWM signals from external AC power supply 110 and control circuit 105 is ideally zero, thereby enabling an input current waveform to be made close to an ideal waveform.

On the other hand, a phase difference occurs between the outputs of external AC power supply 110 and input voltage detection circuit 103 due to a circuit delay and an arithmetic processing delay. Due to this phase difference, the PWM signal is not output at the timing when the AC voltage input from external AC power supply 110 to voltage conversion circuit 101 crosses zero, and hence an input current distortion occurs.

In order to improve this problem, control circuit 105 according to the present disclosure does not limit a threshold, set for the output voltage from input voltage detection circuit 103 in order to determine the output timing of the PWM signal, to zero, thereby correcting the phase delay of the PWM signal with respect to the input AC voltage.

Figure 4:
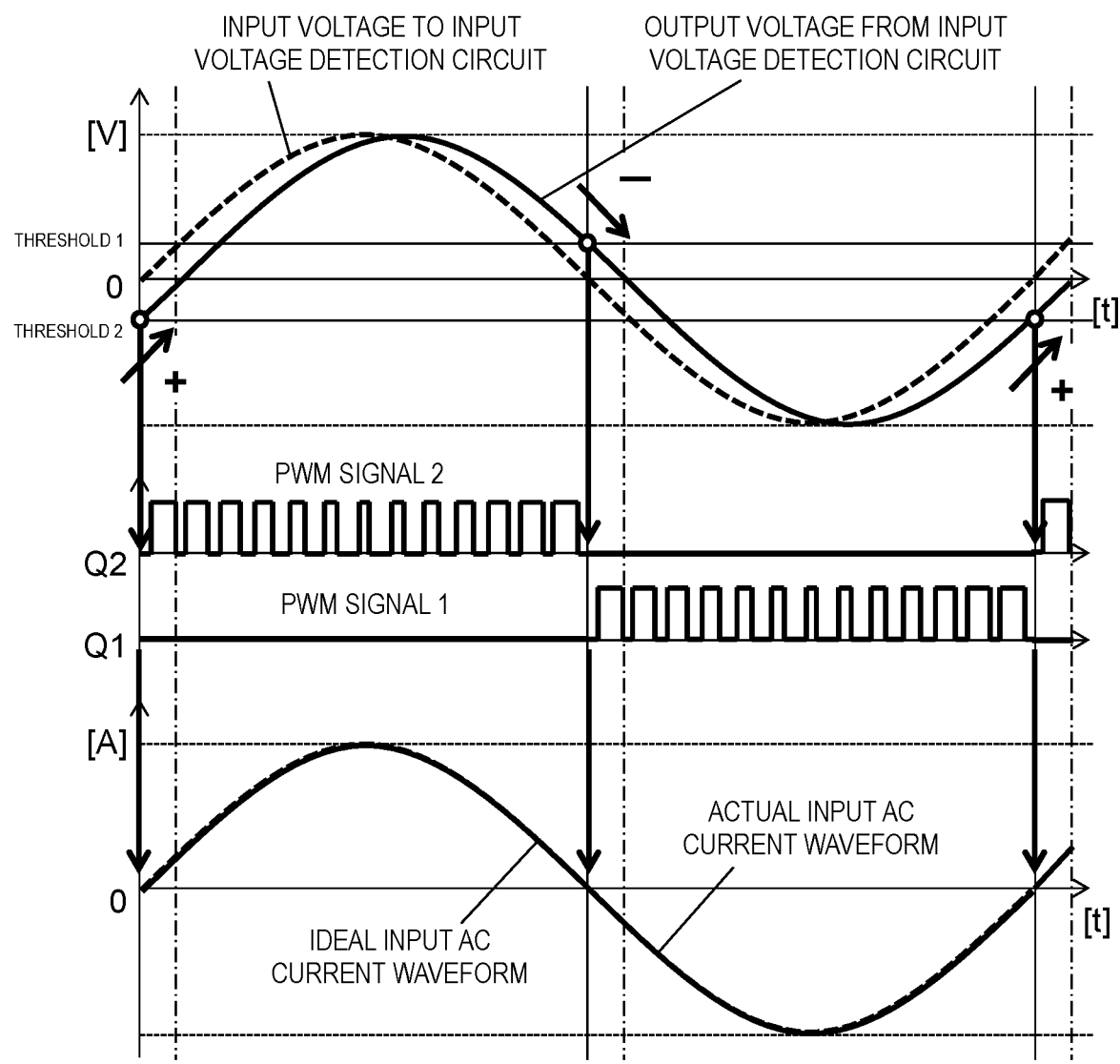
FIG. 4 is a graph showing an input current waveform when a delay time in the first exemplary embodiment is corrected.

FIG. 4 is a graph showing an input current waveform when a delay is corrected. Control circuit 105 monitors the output voltage from input voltage detection circuit 103 and detects a slope, so that two values, a positive threshold and a negative threshold, are provided. When calculating a PWM signal, control circuit 105 calculates the PWM signal by using a corrected threshold for the output voltage from input voltage detection circuit 103.

Thereby, the delay of the PWM signal with respect to the zero-cross of the AC voltage input to voltage conversion circuit 101 can be corrected, and the current harmonic characteristics of the AC current input to voltage conversion circuit 101 can be improved.

At this time, the threshold may be set in advance in control circuit 105, or may be reset based on the output voltage value from input voltage detection circuit 103.

1-2. Operation

Operations of power conversion device 100 configured as described above will be described below. Power conversion device 100 shown in FIG. 3 detects the AC voltage input from external AC power supply 110 to voltage conversion circuit 101 by input voltage detection circuit 103, detects the AC current input by input current detection circuit 102, and detects the DC voltage output from voltage conversion circuit 101 to connection load 120 by output voltage detection circuit 104. Control circuit 105 outputs a PWM signal for controlling voltage conversion circuit 101 by using the detection signals (output voltages) output from input current detection circuit 102, input voltage detection circuit 103, and output voltage detection circuit 104.

Figure 1A:
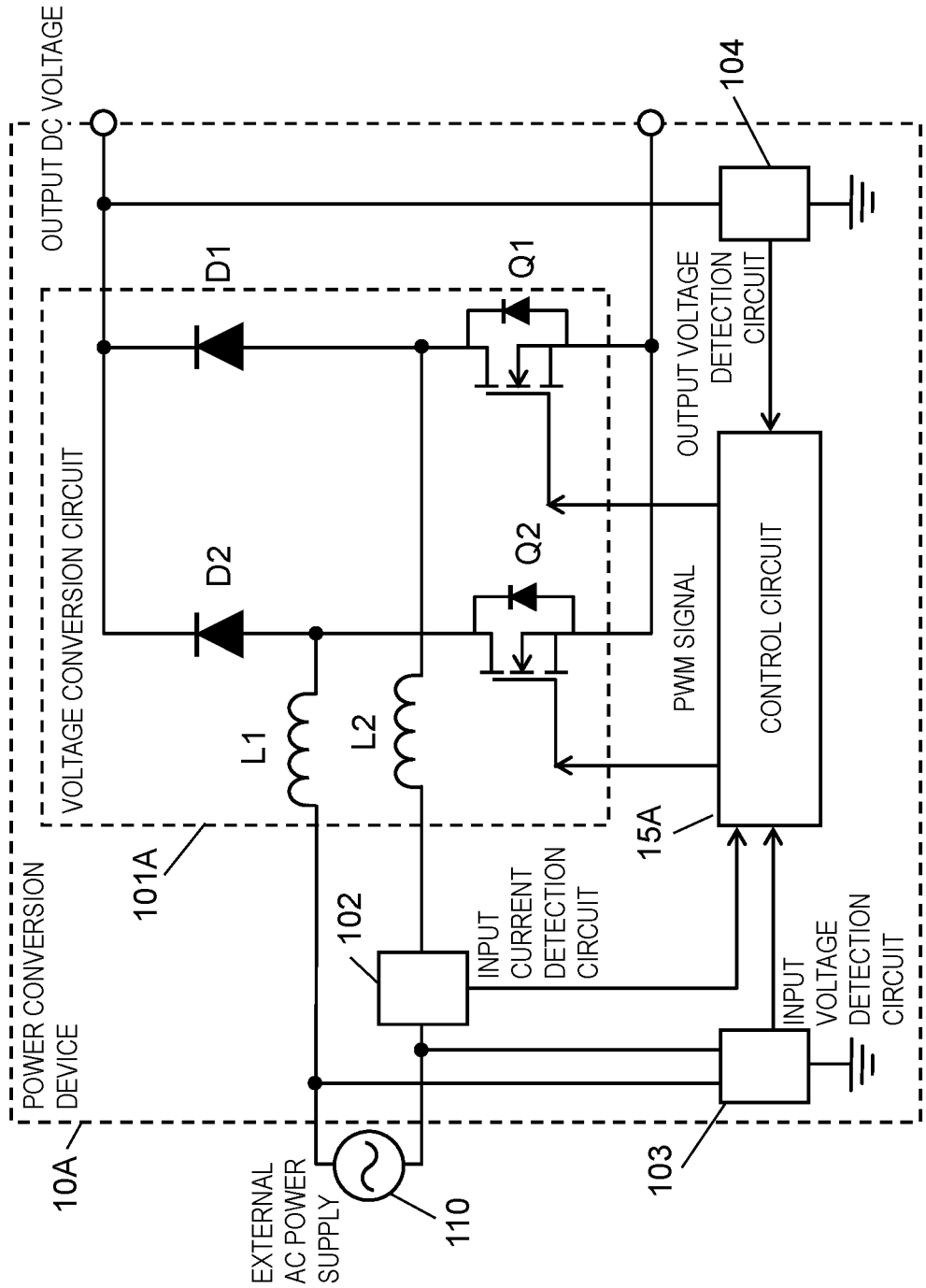
FIG. 1A is a diagram showing a power conversion device including a semi-bridgeless power factor correction circuit having a bridgeless configuration.
Figure 1B:
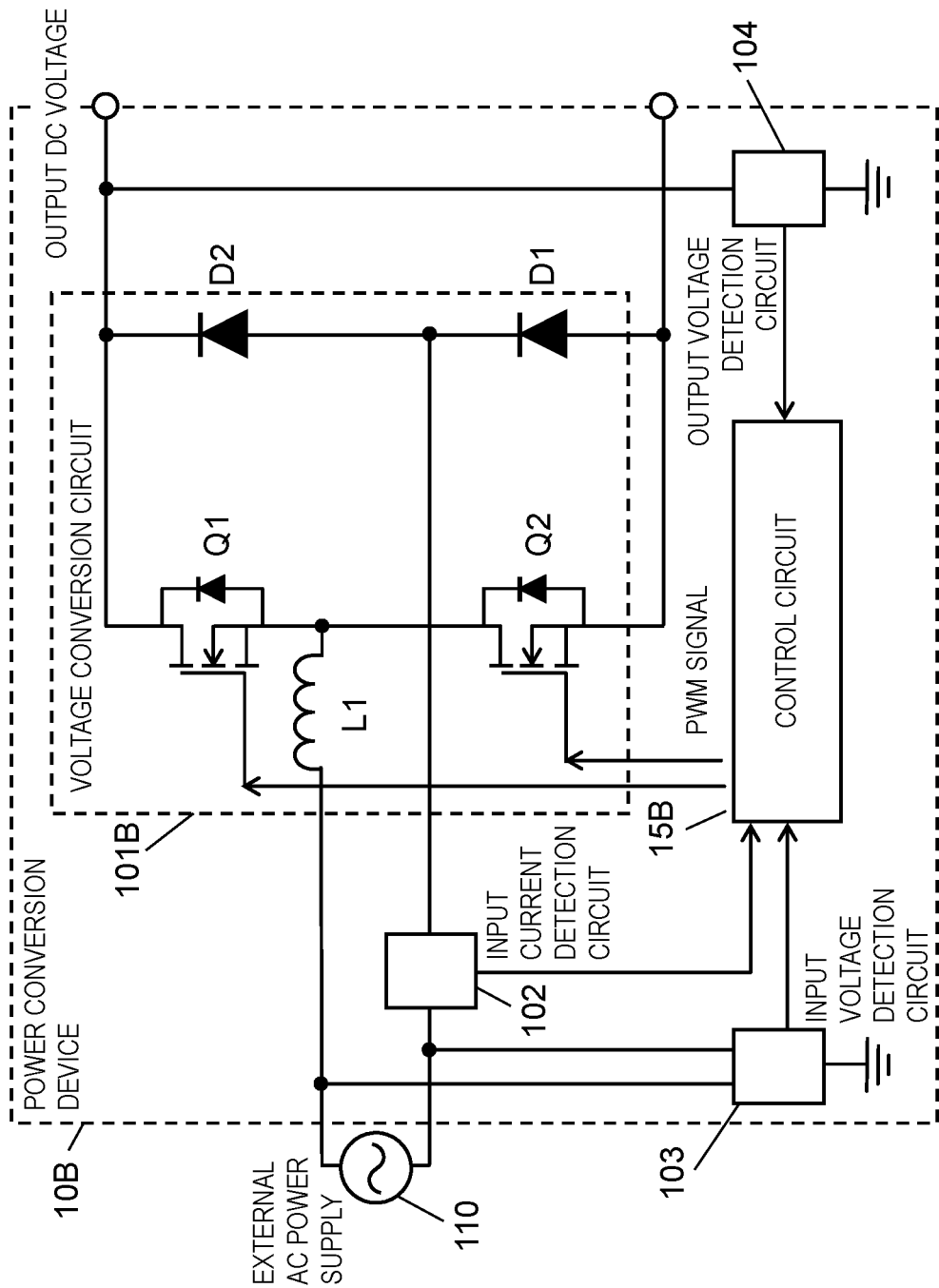
FIG. 1B is a diagram showing a power conversion device including a totem-pole power factor correction circuit having a bridgeless configuration.

In the conventional method, control circuit 15A, 15B, in a power factor correction circuit having a bridgeless configuration as shown in each of FIGS. 1A and 1B, calculates a PWM signal based on the output voltages output from input current detection circuit 102, input voltage detection circuit 103, and output voltage detection circuit 104, so that the PWM signal is output to switching element Q1, Q2. In outputting the PWM signal to switching element Q1, Q2, it is determined which switching element the PWM signal is to be output to, based on the condition of the output voltage from input voltage detection circuit 103. For example, this condition is information on whether the output voltage is positive or negative. Switching the output of the PWM signal to switching element Q1, Q2 is performed at the timing when the output voltage from input voltage detection circuit 103, which has been read by control circuit 15A, 15B, crosses zero. In the example shown in FIG. 2, control circuit 15A, 15B outputs PWM signal 2 to switching element Q2 when the output voltage from input voltage detection circuit 103 is positive, and control circuit 15A, 15B switches the output of the PWM signal at the timing when the output voltage becomes negative (crosses zero), so that PWM signal 1 is output to switching element Q1.

Figure 2:
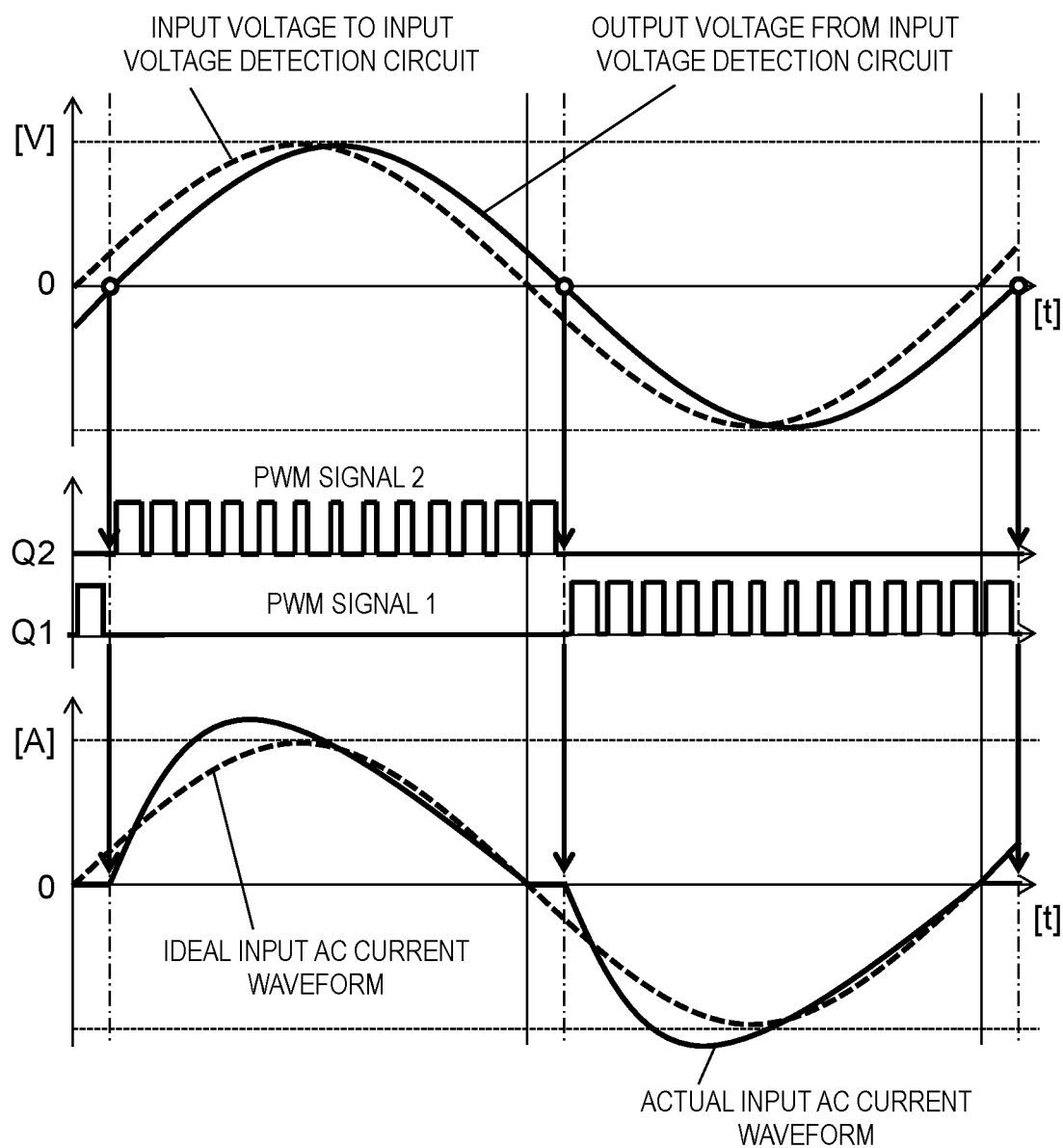
FIG. 2 is a graph showing a mechanism of causing an input current distortion.

However, a delay time actually occurs between the phases of the external AC voltage input to voltage conversion circuit 101 and the output voltage (detection signal) from input voltage detection circuit 103 that detects the external AC voltage. Therefore, when the control circuit calculates a PWM signal based on the zero-cross of the output voltage from input voltage detection circuit 103, the PWM signal, delayed by a certain time with respect to the external AC voltage input to the voltage conversion circuit 101, is output. Therefore, an input current distortion as shown in FIG. 2 occurs.

In order to improve the input current distortion and current harmonic characteristics, control circuit 105 corrects phase delays occurring in input voltage detection circuit 103 and other circuits in the present exemplary embodiment.

The conventional output timing of the PWM signal is determined based on the zero-cross of the output voltage from input voltage detection circuit 103. In the present exemplary embodiment, a threshold to be applied to the output voltage from input voltage detection circuit 103 for determining the output timing of the PWM signal is not limited to zero in order to correct a delay. In a power factor correction circuit having a bridgeless configuration shown in each of FIGS. 1A and 1B, control circuit 15A, 15B switches the PWM signal to switching element Q1, Q2 depending on the condition in which the output voltage from input voltage detection circuit 103 is positive or negative. On the other hand, in the present exemplary embodiment in which a threshold other than zero is applied to the output voltage from input voltage detection circuit 103, it is necessary to provide two thresholds to control circuit 105 depending on whether the output voltage is positive or negative.

At this time, the output voltage from input voltage detection circuit 103 crosses the two thresholds twice in each cycle, and hence it is necessary to add a condition to the determination of the timing when the PWM signal is switched.

Figure 5:
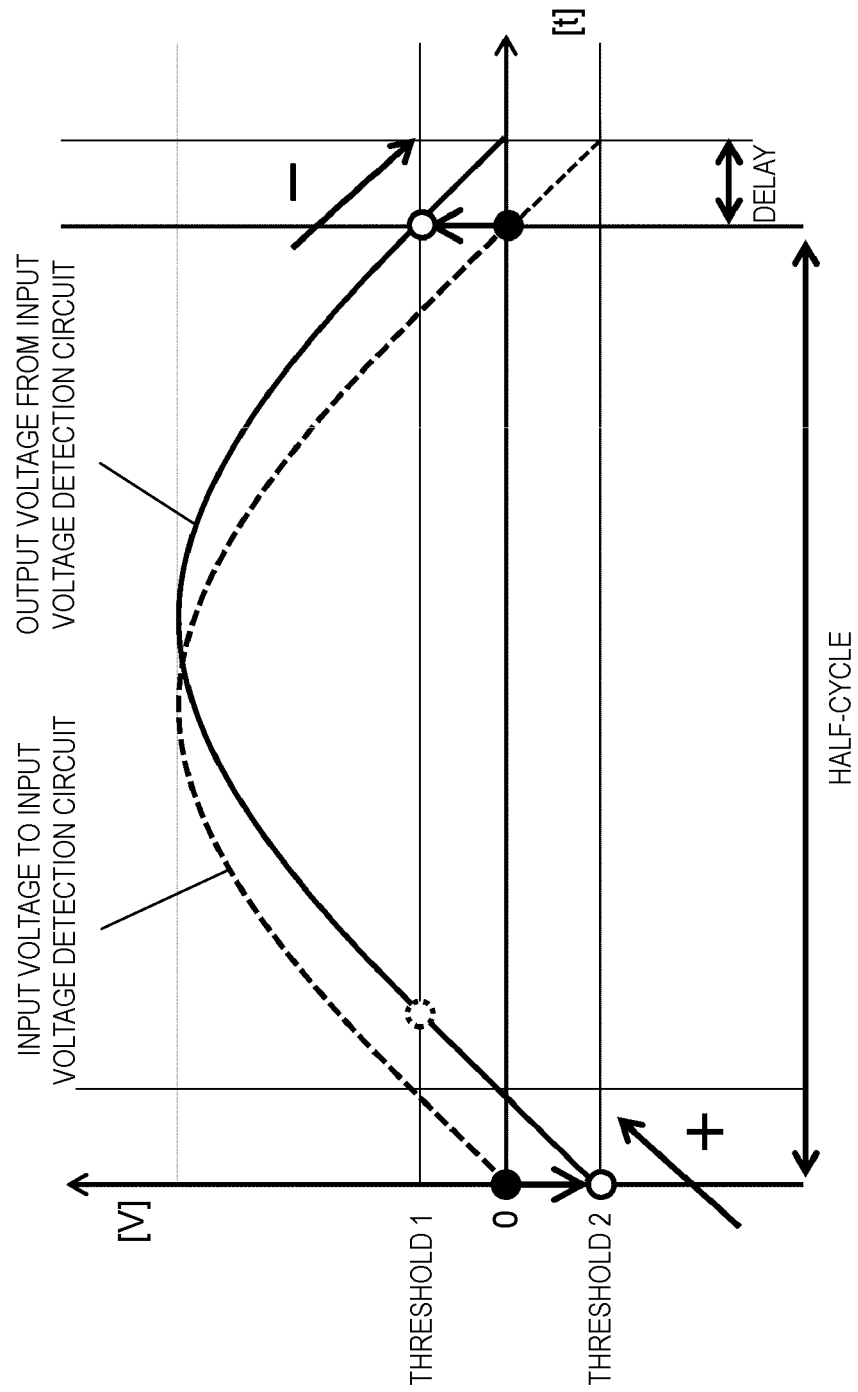
FIG. 5 is a graph showing a delay of an output signal of an input voltage detection circuit according to the first exemplary embodiment.

FIG. 5 shows a positive half-cycle waveform of the input voltage to input voltage detection circuit 103, that is, of the AC voltage input from external AC power supply 110 to voltage conversion circuit 101. With this, the waveform of the output voltage from input voltage detection circuit 103 is overlapped. In order to correct a delay time in input voltage detection circuit 103, the threshold occurring when the slope of the output voltage is positive (+) is changed from zero to a negative value (threshold 2), while the threshold occurring when the slope of the output voltage is negative (−) is changed from zero to a positive value (threshold 1), as shown in FIG. 5. At this time, the output voltage from input voltage detection circuit 103 crosses the positive threshold 1 twice in a positive half-cycle and the negative threshold 2 twice in a negative half-cycle. But, by monitoring the output voltage with control circuit 105 and adding a parameter for determining the slope of the output voltage, a threshold corresponding to the zero-cross of the input voltage can be set from the two crosses.

That is, the timing, at which the input voltage to input voltage detection circuit 103 is switched from negative to positive, may be determined as when the output voltage from input voltage detection circuit 103 crosses negative threshold value 2 while continuously having a positive slope. Similarly, the timing, at which the input voltage to input voltage detection circuit 103 is switched from positive to negative, may be determined as when the output voltage from input voltage detection circuit 103 crosses positive threshold 1 while continuously having a negative slope. Thereby, delay times occurring in input voltage detection circuit 103 and other circuits can be corrected. Since this delay time is a constant time depending on a circuit configuration, the delay can be corrected by setting in advance a threshold in control circuit 105.

At this time, control circuit 105 calculates the PWM signal by using the detection signals (output voltages) output from input current detection circuit 102, input voltage detection circuit 103, and output voltage detection circuit 104. The output voltage from input voltage detection circuit 103 is delayed with respect to the AC voltage input from external AC power supply 110 to voltage conversion circuit 101, and also differs as information indicating the voltage value of the AC current. Therefore, control circuit 105 calculates the PWM signal by correcting the output voltage according to the set threshold or delay time.

Figure 7:
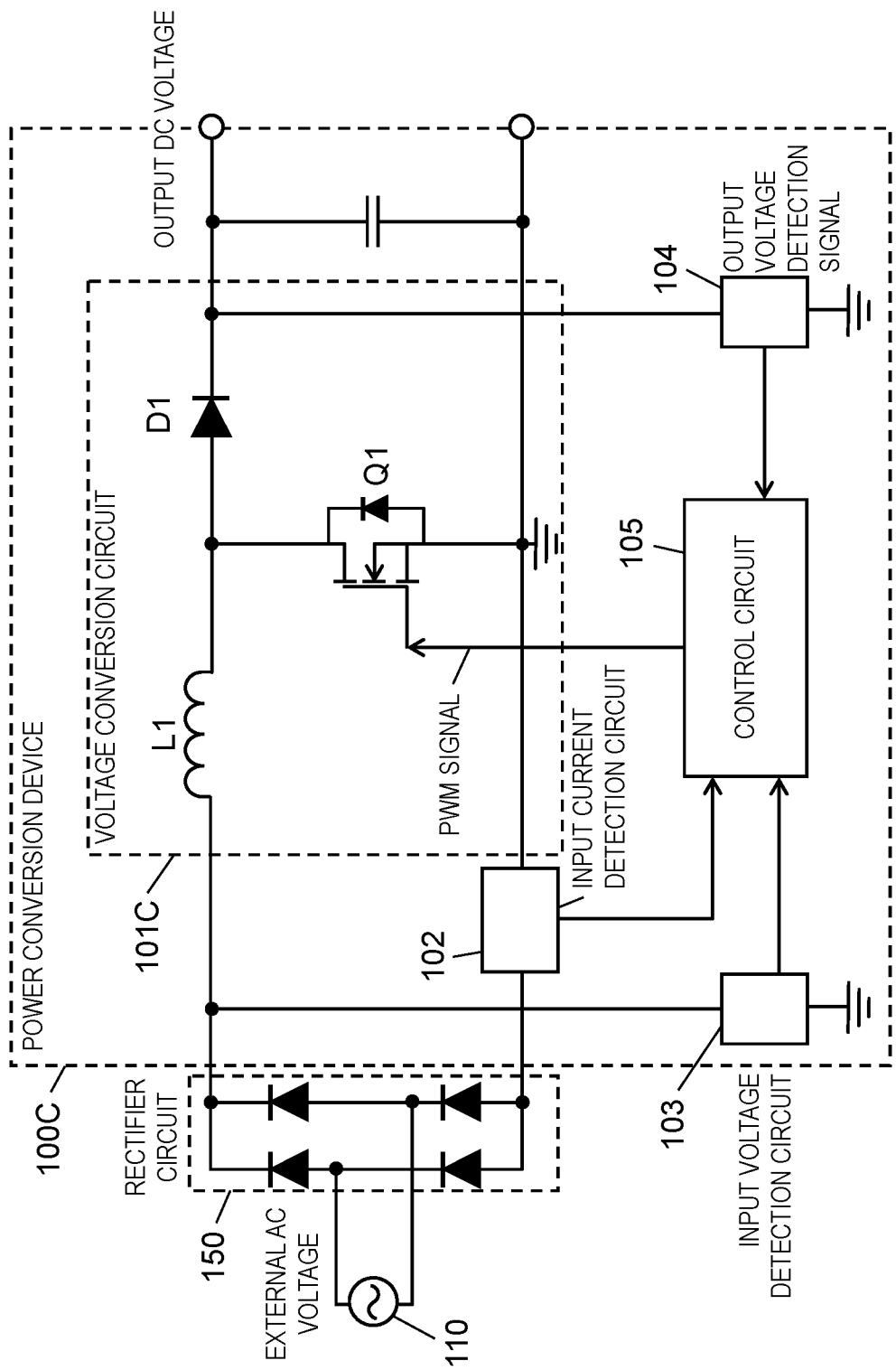
FIG. 7 is a diagram showing an example of the configuration of the power conversion device in FIG. 6 according to the first exemplary embodiment.
Figure 8:
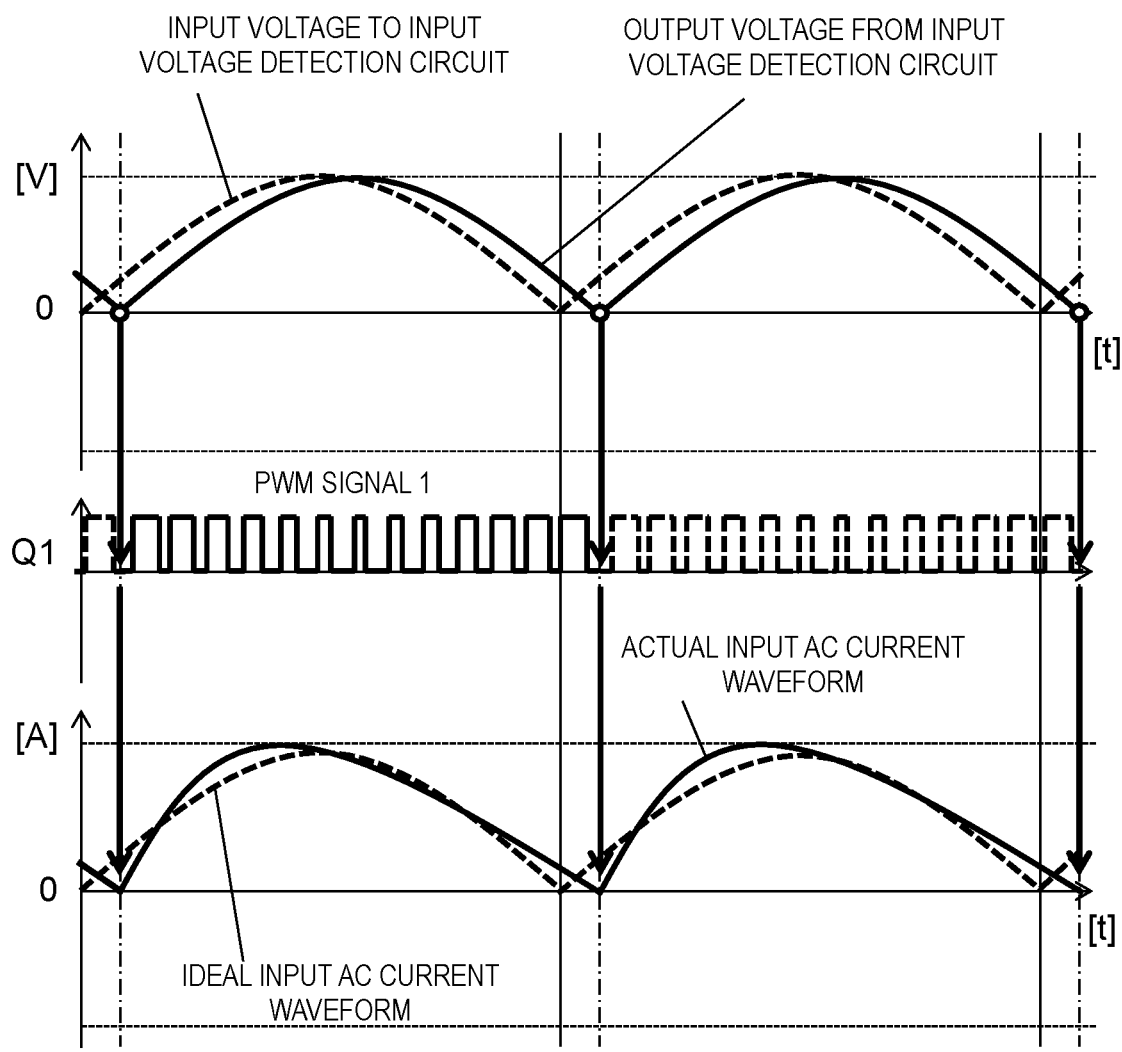
FIG. 8 is a graph showing a current waveform (without correction) of the power conversion device in FIG. 6 according to the first exemplary embodiment.
Figure 9:
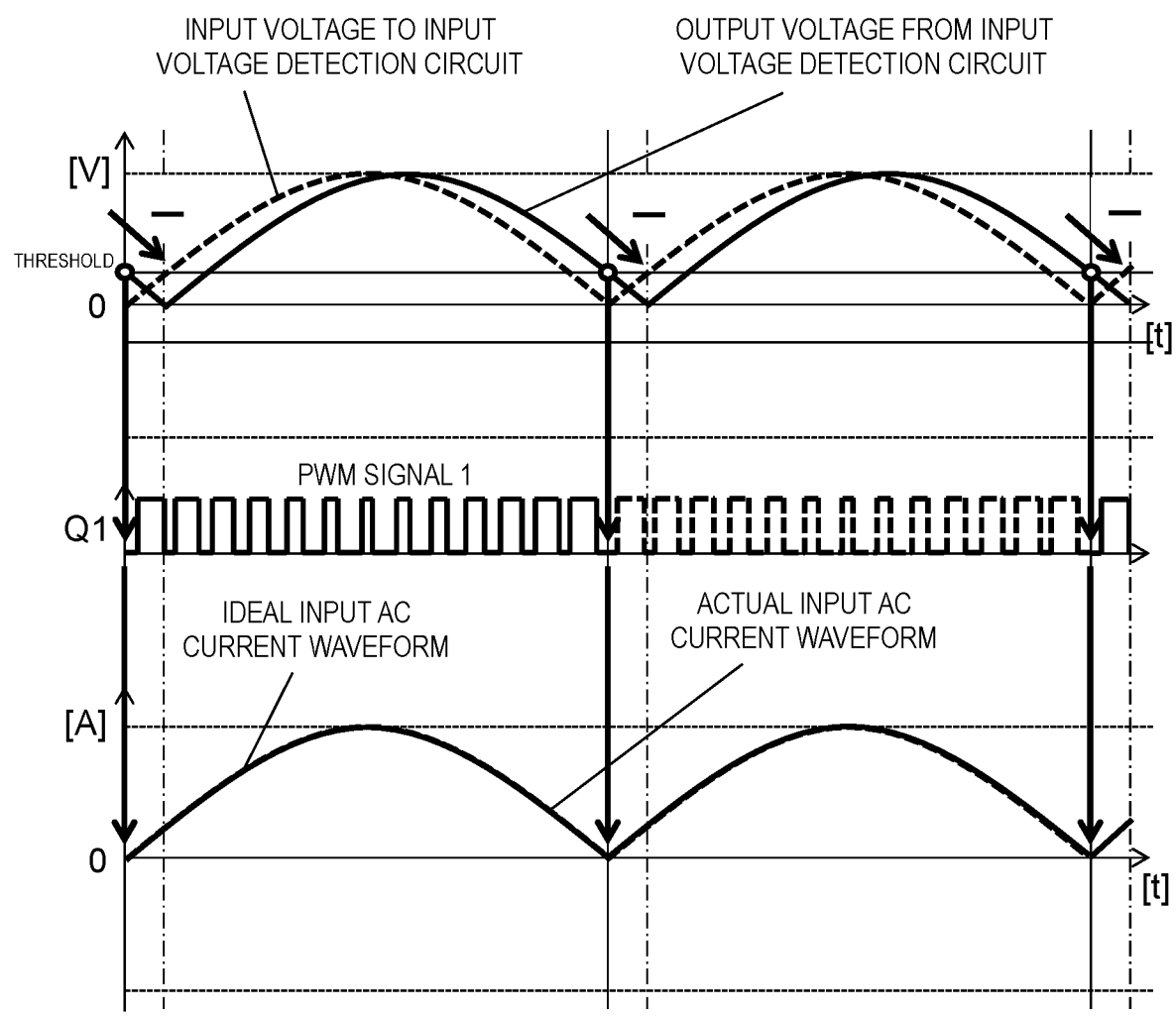
FIG. 9 is a graph showing a current waveform (with correction) of the power conversion device in FIG. 6 according to the first exemplary embodiment.

In the present exemplary embodiment, the case where voltage conversion circuit 101 is configured by voltage conversion circuit 101A, 101B of a power factor correction circuit having a bridgeless configuration as illustrated in each of FIGS. 1A and 1B has been described. But, it can also be implemented as power conversion device 100C having a configuration in which rectifier circuit 150 is provided between external AC power supply 110 and voltage conversion circuit 101C, as shown in each of FIGS. 6 and 7. Rectifier circuit 150 is, for example, a diode bridge as shown in FIG. 7, and in this case, voltage conversion circuit 101C includes inductor L1, MOSFET switching element Q1, and diode D1. At this time, as shown in FIGS. 8 and 9, rectifier circuit 150 rectifies the AC voltage input to voltage conversion circuit 101C and the output voltage output from input voltage detection circuit 103 such that each of the voltages does not take a negative voltage value, and hence the threshold becomes a positive value and the slope at that time takes a negative (−) value.

1-3. Effect

Power conversion device 100 includes: an input terminal to be connected to external AC power supply 110; an output terminal to be connected to connection load 120; input current detection circuit 102 that detects an AC current input from the input terminal; input voltage detection circuit 103 that detects an AC voltage input from the input terminal; voltage conversion circuit 101 that converts the AC voltage input from the input terminal into a DC voltage, and outputs the DC voltage to the output terminal; output voltage detection circuit 104 that detects the DC voltage output from the voltage conversion circuit; and control circuit 105 that generates a PWM signal based on detection signals output from input current detection circuit 102, input voltage detection circuit 103, and output voltage detection circuit 104, and corrects a phase of the PWM signal to output. The voltage conversion circuit has a configuration in which the output DC voltage is concerted by PWM control using the PWM signal.

Thereby, a phase delay time of the PWM signal input to voltage conversion circuit 101 with respect to the AC voltage input to voltage conversion circuit 101 can be corrected, thereby improving current harmonics.

Second Exemplary Embodiment

Figure 10:
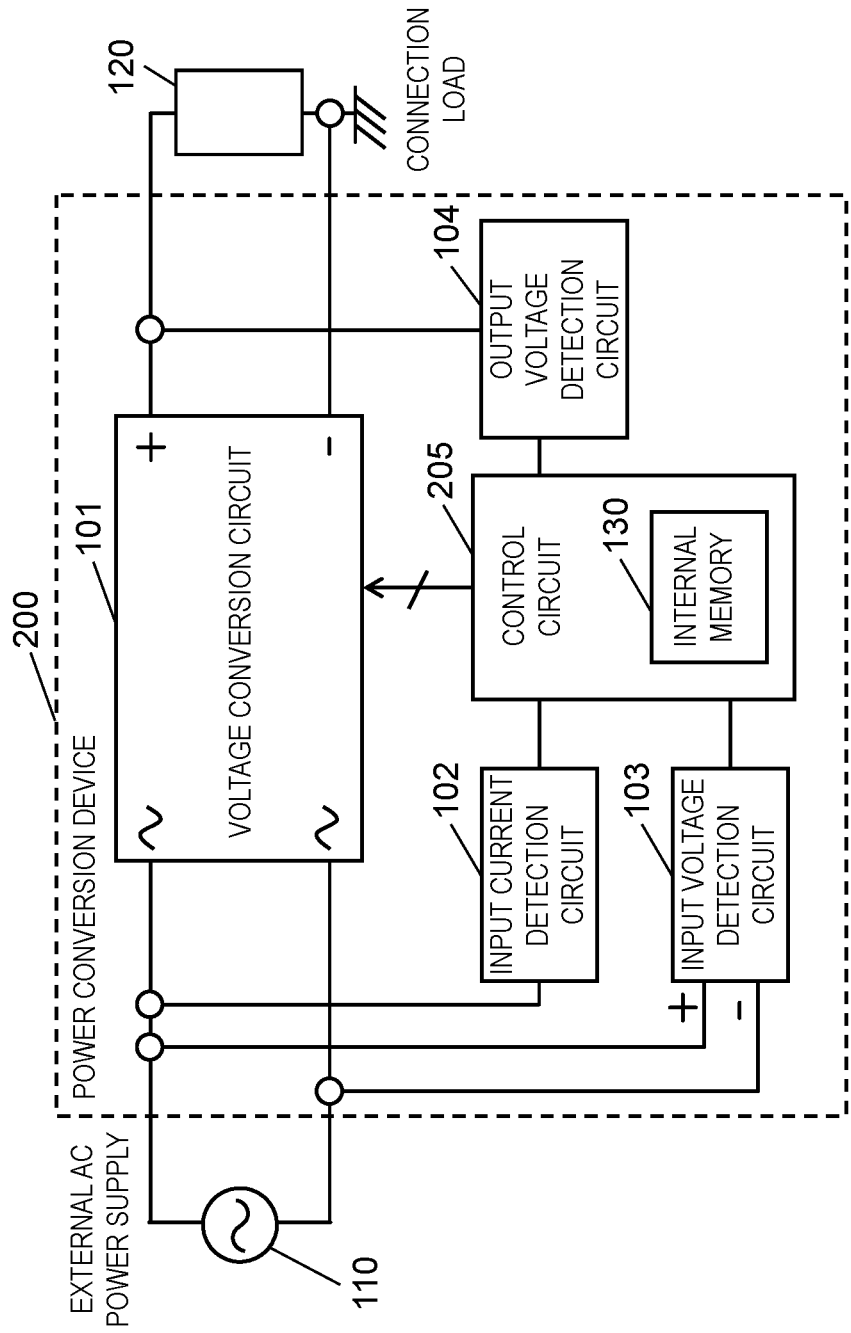
FIG. 10 is a block diagram showing a configuration of a power conversion device according to a second exemplary embodiment.

Hereinafter, a second exemplary embodiment will be described with reference to FIGS. 10 to 12.

2-1. Configuration

In the first exemplary embodiment, control circuit 105 corrects the phase delay of the PWM signal with respect to the AC voltage input to voltage conversion circuit 101 by not limiting the threshold for the output voltage from input voltage detection circuit 103 to zero. Control circuit 205 of power conversion device 200 according to the second exemplary embodiment considers the delay of a PWM signal, refers to the output voltage from input voltage detection circuit 103, and outputs the PWM signal at the timing when the AC voltage input to voltage conversion circuit 101 crosses zero.

Similar to the first exemplary embodiment, control circuit 205 is connected to input current detection circuit 102, input voltage detection circuit 103, output voltage detection circuit 104, and voltage conversion circuit 101. Control circuit 205 also includes internal memory 130. Internal memory 130 holds information for a certain period of time on the waveform of the output voltage from input voltage detection circuit 103.

Control circuit 205 generates a PWM signal for controlling voltage conversion circuit 101 based on: the output voltage (detection signal) output from input voltage detection circuit 103 before a period of time obtained by adding a certain time corresponding to the delay to the one cycle held in internal memory 130; and the output voltages (detection signals) output from input current detection circuit 102 and output voltage detection circuit 104. At this time, the output voltages from input current detection circuit 102 and output voltage detection circuit 104 are real-time detection signals.

Figure 11:
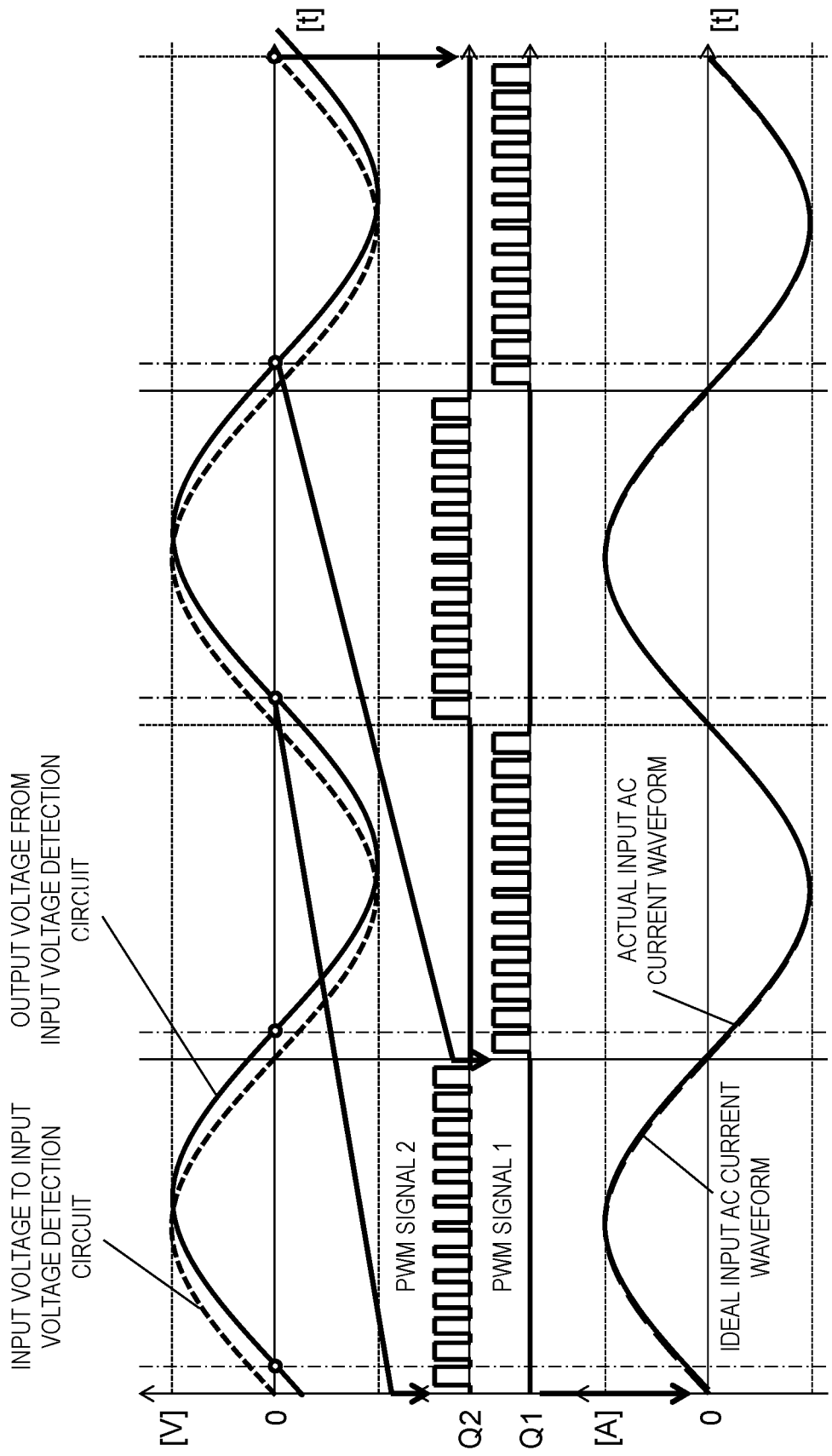
FIG. 11 is a graph showing an input current waveform when a delay time is corrected in the second exemplary embodiment.

FIG. 11 is a graph showing an input AC current waveform when the phase delay of a PWM signal is corrected. Control circuit 205: monitors the output voltage from input voltage detection circuit 103; corrects a delay time by using the voltage signal from input voltage detection circuit 103 before a period of time obtained by adding a certain time corresponding to the delay to the one cycle held in internal memory 130; and enables the output of the PWM signal to be started at the timing when the AC voltage input to voltage conversion circuit 101 crosses zero.

At this time, the certain time corresponding to the delay may be set in advance in control circuit 205, or may be reset by control circuit 205 based on phase information obtained by detecting an actual delay with phase detection circuit 106 or the like.

Figure 12:
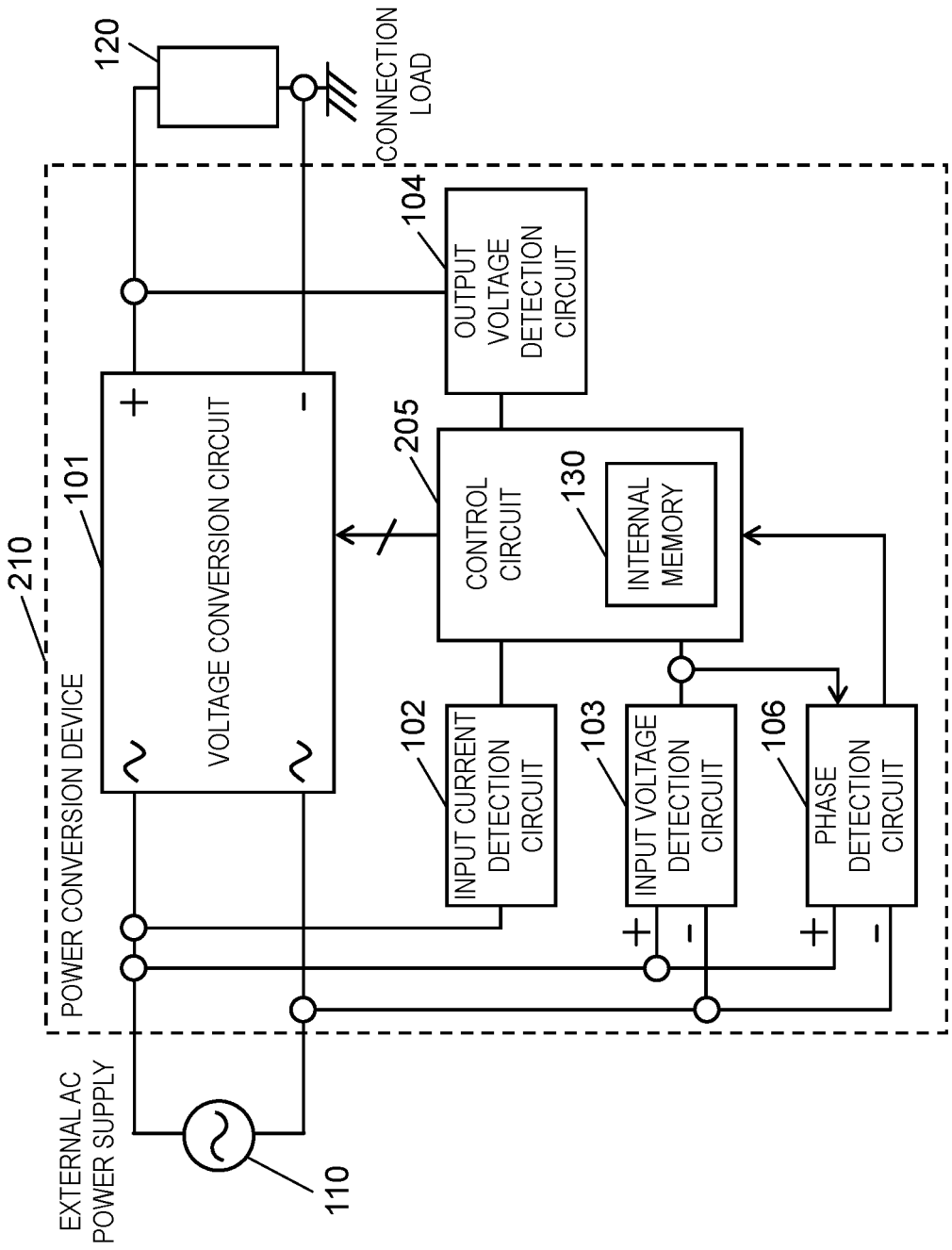
FIG. 12 is a block diagram showing a configuration in which a phase detection circuit according to the second exemplary embodiment is added.

FIG. 12 shows power conversion device 210 that further includes phase detection circuit 106. Phase detection circuit 106 is connected to the input and output of input voltage detection circuit 103. Phase detection circuit 106 is also connected to control circuit 205 in order to detect a signal delay in input voltage detection circuit 103 and communicate signal delay information to control circuit 205. Based on this signal delay information, control circuit 205 outputs a PWM signal at the timing when the AC voltage input to voltage conversion circuit 101 crosses zero. Phase detection circuit 106 is, for example, a phase comparator using a comparator.

In the present disclosure, phase detection circuit 106 is connected to the input and output of input voltage detection circuit 103 in order to detect the phase delay time in input voltage detection circuit 103, but it may be connected to the input and output of control circuit 205 in order to detect the delay time in control circuit 205, or it may be connected to the input of input voltage detection circuit 103 and the output of control circuit 205 in order to detect the delay times both in input voltage detection circuit 103 and in control circuit 105.

2-2. Operation

Operations of power conversion devices 200, 210 configured as described above will be described below. Power conversion device 200 shown in FIG. 10 detects the AC voltage input from external AC power supply 110 to voltage conversion circuit 101 by input voltage detection circuit 103, detects the input AC current by input current detection circuit 102, and detects by output voltage detection circuit 104 the DC voltage output to connection load 120 by voltage conversion circuit 101. Control circuit 205 has internal memory 130 and holds information on the detection signals (output voltages) output from input voltage detection circuit 103 for a certain period of time. Control circuit 205 outputs a PWM signal for controlling the voltage conversion circuit by using the detection signals (output voltages) output from input current detection circuit 102 and output voltage detection circuit 104 and the output voltage from input voltage detection circuit 103 held in internal memory 130.

In the power factor correction circuits of FIGS. 1A, 1B, and 7, the PWM signal is output based on the output voltage from input voltage detection circuit 103, but as described in the first exemplary embodiment, a distortion is caused in the AC current input to voltage conversion circuit 101 due to the delay times in input voltage detection circuit 103 and other circuits.

In the first exemplary embodiment, the delay time is corrected by not limiting the threshold for the output voltage from input voltage detection circuit 103, which is used to determine the timing when the PWM signal is switched, to zero, but in the second exemplary embodiment, the delay time is corrected by using the output voltage from input voltage detection circuit 103 that is held in internal memory 130 for a certain period of time. FIG. 11 shows the concept of correcting the delay time in the second exemplary embodiment.

Since external AC power supply 110 generates a periodic AC voltage, the voltage value indicated by the detection signal of input voltage detection circuit 103 matches the voltage value one cycle before. In order to refer to the voltage value before the delay time caused between the AC voltage from the external AC power supply 110 input to voltage conversion circuit 101 and the output voltage from input voltage detection circuit 103, the voltage value, occurring before a period of time obtained by adding the delay time to the one cycle held in internal memory 130, may be referred to. In calculating the PWM signal, by using the voltage value before the period of time obtained by adding the delay time to this one cycle and by referring to the real-time values of the output voltages from input current detection circuit 102 and output voltage detection circuit 104, current harmonic characteristics can be improved.

Additionally, by detecting a delay time occurring between the AC voltage from external AC power supply 110 input to voltage conversion circuit 101 and the output voltage from input voltage detection circuit 103 with the use of phase detection circuit 106 as in power conversion device 210 shown in FIG. 12, it is also possible to refer, from internal memory 130, to the voltage value before a period of time obtained by adding the delay time to the one cycle detected by reflecting on control circuit 205.

2-3. Effect

Power conversion device 200 includes: an input terminal to be connected to external AC power supply 110; an output terminal to be connected to connection load 120; input current detection circuit 102 that detects an AC current input from the input terminal; input voltage detection circuit 103 that detects an input AC voltage input from the input terminal; voltage conversion circuit 101 that converts the AC voltage input from the input terminal into a DC voltage, and outputs the DC voltage to the output terminal; output voltage detection circuit 104 that detects the DC voltage output from the voltage conversion circuit; and control circuit 205. Control circuit 205 generates a PWM signal based on the output voltages from input current detection circuit 102, input voltage detection circuit 103, and output voltage detection circuit 104, corrects the phase of the PWM signal, and outputs it. Voltage conversion circuit 101 converts an AC voltage into a DC voltage by PWM control using the PWM signal. Control circuit 205 has internal memory 130, and temporarily holds in internal memory 130 a detection signal indicating the AC voltage detected by input voltage detection circuit 103.

Control circuit 205 calculates the PWM signal by using the output voltage from input voltage detection circuit 103, occurring before a period of time obtained by adding a constant time corresponding to the delay to one cycle, so that the delay time of a PWM signal input to voltage conversion circuit 101, with respect to the AC voltage input to voltage conversion circuit 101, is corrected.

In addition to the configuration of power conversion device 200, power conversion device 210 includes phase detection circuit 106 that detects a phase difference between the AC voltage input to input voltage detection circuit 103 and the output voltage from input voltage detection circuit 103. Control circuit 205 sets a delay time based on the phase difference detected by phase detection circuit 106, and calculates a PWM signal by using the output voltage from input voltage detection circuit 103, occurring before a period of time obtained by adding the delay time to one cycle, thereby correcting the phase of the PWM signal. Thereby, power converters 200 and 210 can improve current harmonics.

Other Exemplary Embodiments

As described above, the first and second exemplary embodiments have been described as examples of the technology disclosed in the present application. However, the technology in the present disclosure is not limited to these, and can be applied to exemplary embodiments in which modifications, replacements, additions, omissions, etc., have been made. Additionally, a new exemplary embodiment can be made by combining the respective constituent elements described in the first and second exemplary embodiments. So, other exemplary embodiments will be illustrated below.

Although the delay time in input voltage detection circuit 103 has been described in the first and second exemplary embodiments, delays in a plurality of circuits connected to input voltage detection circuit 103 may be corrected. Additionally, the delays caused in input current detection circuit 102 and output voltage detection circuit 104 may be corrected in the same way.

Figure 6:
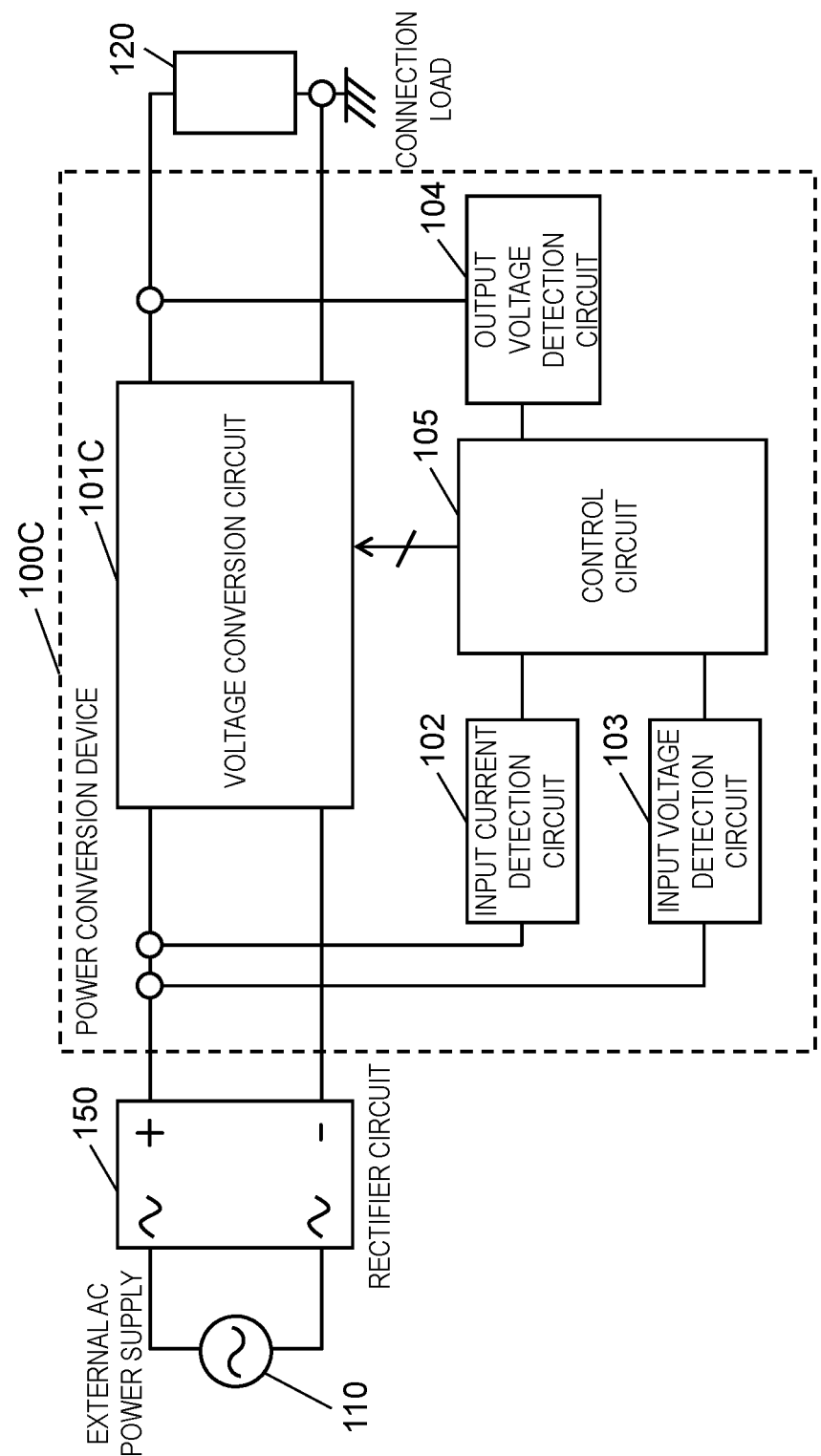
FIG. 6 is a block diagram showing a configuration of the power conversion device according to the first exemplary embodiment to which a rectifier circuit is added.

In the first and second exemplary embodiments, no additional circuit, other than rectifier circuit 150 shown in FIG. 6, is included between external AC power supply 110 and voltage conversion circuit 101, but a circuit, such as a filter circuit, may be added.

The first and second exemplary embodiments have been described such that the amplitude of the external AC voltage is constant. The control circuit may detect the amplitude of the external AC voltage in order to correct the threshold or delay time according to the amplitude. When a voltage different from a periodic voltage is transiently input, the voltage value to be referred to and the time can be reviewed.

The first and second exemplary embodiments have been described such that the frequency of the external AC voltage is constant. A frequency detection circuit may be added, or the control circuit may detect the frequency in order to correct the threshold or the delay time according to the frequency.

In the second exemplary embodiment, an example in which a delay is detected by phase detection circuit 106 has been described. A different circuit that detects a delay, not limited to a phase, may be used.

INDUSTRIAL APPLICABILITY

The present disclosure can be applied to voltage conversion circuits having a power factor correction circuit. Specifically, it is useful for electronic equipment to be used in ships, aircraft, etc., the input frequencies of which are high, and for commercial equipment that requires medium and large power, such as servers, TVs, and OA equipment.

REFERENCE MARKS IN THE DRAWINGS

10A, 10B, 100, 100C, 200, 210: power conversion device
101, 101A, 101B, 101C: voltage conversion circuit
102: input current detection circuit
103: input voltage detection circuit
104: output voltage detection circuit
15A, 15B, 105, 205: control circuit
106: phase detection circuit
110: external AC power supply
120: connection load
130: internal memory
150: rectifier circuit

The invention claimed is:

1. A power conversion device comprising:
   a voltage conversion circuit that converts an AC voltage input to the voltage conversion circuit into a DC voltage by pulse width modulation (PWM) control and outputs the DC voltage;
   an input voltage detection circuit that detects the AC voltage input to the voltage conversion circuit and outputs a detection signal;
   an input current detection circuit that detects an AC current input to the voltage conversion circuit and outputs a detection signal;
   an output voltage detection circuit that detects the DC voltage output from the voltage conversion circuit and outputs a detection signal; and
   a control circuit that corrects a phase delay of a PWM signal for the PWM control, the phase delay being caused by the input voltage detection circuit, based on the detection signal from the input voltage detection circuit, the detection signal from the input current detection circuit, and the detection signal from the output voltage detection circuit, and outputs the PWM signal corrected to the voltage conversion circuit, wherein
   the control circuit determines a sign of a slope of a voltage of the detection signal from the input voltage detection circuit,
   wherein either (i) when the control circuit determines that the slope is negative and the voltage of the detection signal from the input voltage detection circuit is less than a first threshold that is a positive value or (ii) when the control circuit determines that the slope is positive and the voltage of the detection signal from the input voltage detection circuit is greater than a second threshold that is a negative value, the control circuit corrects the phase delay of the PWM signal.

2. The power conversion device according to claim 1, further comprising a rectifier circuit that rectifies the AC voltage input to the voltage conversion circuit, wherein
   the input voltage detection circuit detects the AC voltage rectified by the rectifier circuit, and
   the input current detection circuit detects the input current rectified by the rectifier circuit.

3. The power conversion device according to claim 1, wherein the control circuit sets the first threshold and the second threshold according to amplitude of the AC voltage input to the voltage conversion circuit.

4. The power conversion device according to claim 1, further comprising a phase detection circuit that detects a phase difference between the AC voltage input to the input voltage detection circuit and the detection signal output from the input voltage detection circuit, wherein the control circuit corrects the phase of the PWM signal based on the phase difference detected by the phase detection circuit.

5. The power conversion device according to claim 1, wherein the control circuit corrects the phase of the PWM signal based on a frequency of the AC voltage.

6. The power conversion device according to claim 1, further comprising a phase detection circuit that detects a phase difference between the AC voltage input to the input voltage detection circuit and the detection signal output from the input voltage detection circuit, wherein the control circuit sets the first threshold and the second threshold based on the phase difference detected by the phase detection circuit.

7. The power conversion device according to claim 1, wherein the control circuit sets the first threshold and the second threshold based on a frequency of the AC voltage.

8. The power conversion device according to claim 1, wherein the control circuit corrects the phase of the PWM signal by using the detection signal detected by the input voltage detection circuit in a previous period of time.

9. A power conversion method comprising:
   a first step of detecting an AC voltage input to a voltage conversion circuit and outputting a detection signal;
   a second step of detecting an AC current input to the voltage conversion circuit and outputting a detection signal;
   a third step of converting the AC voltage input to the voltage conversion circuit into a DC voltage by pulse width modulation (PWM) control and outputting the DC voltage;
   a fourth step of detecting the DC voltage output in the third step and outputting a detection signal; and
   a fifth step of correcting a phase delay of a PWM signal for the PWM control, the phase delay being caused by the first step, based on the detection signal output in the first step, the detection signal output in the second step, and the detection signal output in the fourth step, and outputting the PWM signal corrected to the voltage conversion circuit, wherein the fifth step includes determining a sign of a slope of a voltage of the detection signal output in the first step, wherein either (i) when it is determined in the fifth step that the slope is negative and the voltage of the detection signal output in the first step is less than a first threshold that is a positive value or (ii) when it is determined in the fifth step that the slope is positive and the voltage of the detection signal output in the first step is greater than a second threshold that is a negative value, the phase delay of the PWM signal in the fifth step is corrected.

* * * * *